United States Patent [19]

McCoy et al.

[11] Patent Number: 5,760,747
[45] Date of Patent: Jun. 2, 1998

[54] ENERGY DIVERSITY ANTENNA

[75] Inventors: Danny O. McCoy, Sunrise; Oscar M. Garay, Coral Springs; Roger Y. S. Tay, Sunrise; Quirino Balzano, Plantation, all of Fla.

[73] Assignee: Motorola, Inc., Schaumburg

[21] Appl. No.: 610,008

[22] Filed: Mar. 4, 1996

[51] Int. Cl.[6] ................................ H01Q 21/00
[52] U.S. Cl. .................. 343/728; 343/725; 343/729; 343/866
[58] Field of Search ................. 343/728, 725, 343/726, 729, 702, 866, 741; H01Q 21/00

[56] References Cited

U.S. PATENT DOCUMENTS

| | | | |
|---|---|---|---|
| 5,255,005 | 10/1993 | Terret et al. | 343/895 |
| 5,355,144 | 10/1994 | Walton et al. | 343/713 |
| 5,463,406 | 10/1995 | Vannatta et al. | 343/702 |
| 5,557,293 | 9/1996 | McCoy et al. | 343/702 |
| 5,581,264 | 12/1996 | Tabata et al. | 343/713 |

*Primary Examiner*—Hoanganh T. Le
*Attorney, Agent, or Firm*—Frank M. Scutch

[57] ABSTRACT

An energy diversity antenna (100) includes a first antenna (103) and second antenna (113) positioned on a substrate (101). The first antenna is preferably a loop used for receiving radio frequency signals with H-field energy while the second antenna is preferably a monopole used for receiving radio frequency signals with E-field energy. The energy diversity antenna (100) is applicable for use in portable communications devices capable of diversity reception. It is particularly useful in geographic locations where reflections and multipath interference is a problem.

13 Claims, 2 Drawing Sheets

ENERGY DIVERSITY ANTENNA

TECHNICAL FIELD

This invention relates in general to antennas and more particularly to space saving antenna structures.

BACKGROUND

Many antenna configurations have been devised for use with cellular as well as mobile/portable two way personal communication devices. These antennas range from monopole/dipole type cylindrical radiators to loops and flat patch-type radiators which may be easily concealed. Each type of antenna has its own advantages as well as disadvantages requiring the designer to take all factors into consideration before selecting the appropriate antenna design. In light of the smaller personal communications devices that are in demand today, future antennas are more often required to be smaller providing reliable communications at typical frequencies of 800 Mhz and higher.

One problem associated with the transmission and reception of radio frequency (RF) signals, using small portable communication antennas, is that of multipath interference. Multipath interference occurs and becomes a significant problem where there are a high number of reflections such as inside buildings, automobiles or in urban areas of large cities. RF signals used in these areas often bounce between objects located in these areas. This, in turn, can produce standing waves regions in view of the high amounts of reflected energy. If these standing wave regions were probed using either an E-field (electrical field) or H-field (magnetic field) type antenna, the received signal strength would indicate a series of peaks and nulls points. Since the peak amplitude of the E-field and H-field occur approximately 180 degrees out of phase, a peak of either the E-field or H-field would be located where the other field is at a null. Although single E-field or H-field antennas can be used in an attempt to receive energy in these multipath regions, this technique most often is not capable of providing enough gain to satisfy a receiver's sensitivity requirements.

One way in which to counteract the interference caused by standing waves has been through the use of a diversity receiving system. Prior art FIG. 1 depicts a block diagram of a common spatial diversity receiving system 10. Typical spatial diversity systems place a number of antennas 1 to N (of the same field type) in different locations. The problem with this approach is, in most cases, even through they use diversity, a significant increase in signal strength will not occur even though a receiver has the ability to switch between the various antennas. Diversity will only help if significant space is used between the various antennas.

Thus, the need exists to provide an alternative antenna configuration which can be used with a diversity receiving system that takes up limited space and provides an overall increase in gain to provide more reliable communications in urban areas having a high incidence of standing waves.

DETAILED DESCRIPTION OF THE PREFERRED EMBODIMENT

Figure 1:
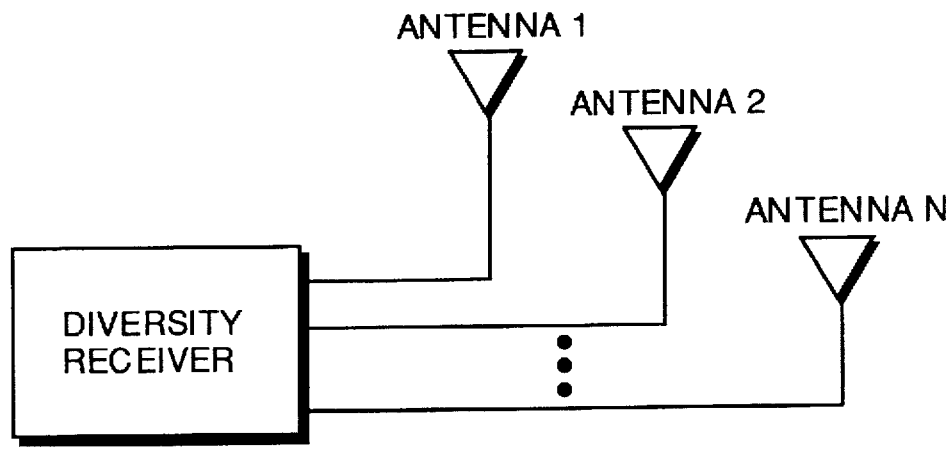
FIG. 1 is a prior art showing a typical spatial diversity receiving system.
Figure 2:
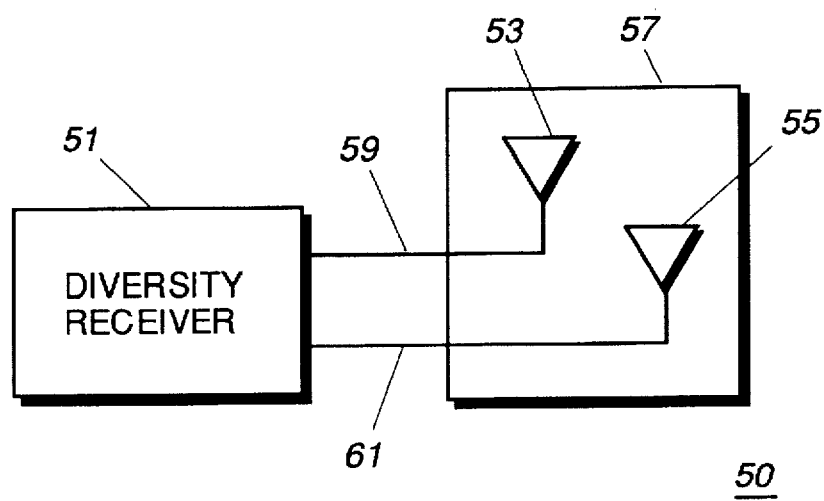
FIG. 2 is a block diagram showing the diversity antenna structure according to the preferred embodiment of the invention.

Referring now to FIG. 2, a diversity receiver system 50 according to a preferred embodiment of the invention includes a diversity transceiver or receiver 51 which is attached to two or more collocated antennas 53, 55. The collocated antennas 53,55 differ in structure and are positioned on a single substrate 57 and include separate feed lines 59, 61 for connection to the diversity receiver 51. As will be discussed hereinafter, one of the antennas is typically a loop antenna while the other collocated antenna is a monopole antenna.

Figure 3:
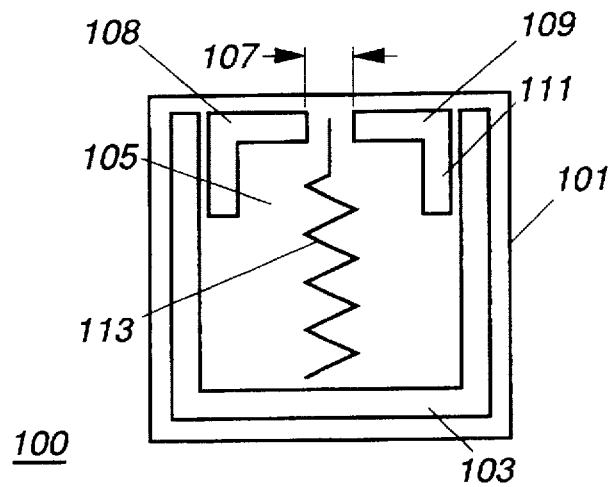
FIG. 3 is a top plan view of the diversity antenna structure according to the preferred embodiment of the invention.

As seen in FIG. 3, a top plan view of the diversity antenna structure 100 includes a planar substrate 101 upon which one or more small substantially flat antennas may be positioned. As is well known in the art, these antennas are used for reception of radio frequency transmissions. The planar substrate 101 is typically a printed circuit board manufactured out of fire-retarding epoxy resin/glass cloth laminate (FR-4), but other compounds such as bismaleimide/triazine (BT) or polyimide may also be used.

According to the preferred embodiment of the invention, around the outer perimeter of one surface of the substrate 101, a loop antenna 103 is positioned. The radiator of the loop antenna is in a substantially C-shaped planar configuration with one open end 105. The size of the loop antenna 103 and open end 105 will determine the resonant frequency of the loop antenna 103. As is well known in the art, the radiator of the loop antenna 103 is manufactured of a highly conductive material such as copper or the like. The radiator is preferably formed using one or more traces on the surface of the substrate 101. Although in preferred embodiment, each trace is shown etched upon the substrate 101 of a printed circuit board, it will be recognized by those skilled in the art that ordinary wire conductors could also be used and affixed to the surface of the substrate 101. It will also be recognized that a loop antenna is particularly useful for receiving H-field radio frequency (RF) energy.

In order to properly match an RF transmission line (not shown) to the loop antenna 103, it is necessary to utilize a balun or matching network. A capacitive coupler 107 includes two substantially L-shaped coupling structures that are each positioned a predetermined distance from the loop antenna 103. Each L-shaped structure 108 includes a leg portion 109 and base portion 111. The base portion 111 is then positioned in parallel with a segment of the loop antenna 103. The desired coupling coefficient between the capacitive coupler 107 and the loop antenna 103 is a function of the distance selected. Although shown in this embodiment as an L-shaped configuration, it will be evident to a skilled artisan that a capacative coupler can take many forms by varying the shape, size and gap between the traces used to from the coupler.

In addition to the loop antenna 103, a monopole antenna 113 is positioned in a central position between the substantially C-shaped sections of the loop antenna 103 within the open end 105. The monopole antenna 113 is comprised of a plurality of interconnected linear or non-linear segments. Although shown in FIG. 3 as substantially Z-shaped planar segments whose serpentine shape form a radiator for the monopole antenna 113, it will be evident to a skilled artisan that these segments can take any shape or form. The monopole antenna 113 is directly fed using a separate feed line (not shown) from that of the loop antenna 103 so as an associated diversity receiving receiver can select either antenna for use. As is well known to those skilled in the art, a monopole antenna is particularly useful for receiving E-field RF energy.

Figure 4:
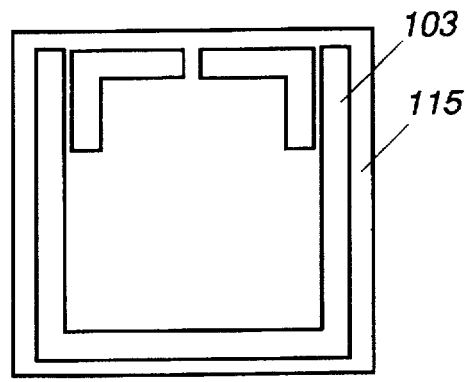
FIG. 4 is an alternative embodiment of the invention as seen in FIG. 3 showing a loop antenna on the one side of a substrate.
Figure 5:
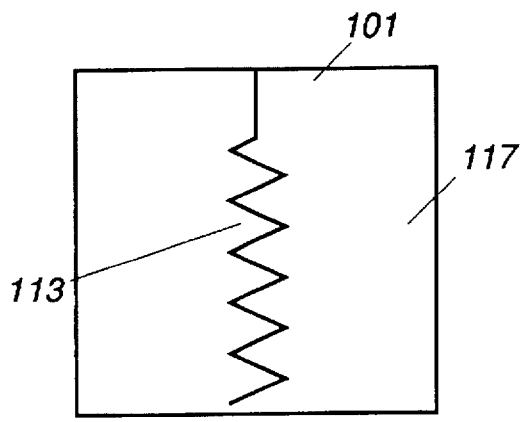
FIG. 5 is the alternative embodiment as shown in FIG. 4 showing a monopole antenna on the opposite side of the substrate.

In another embodiment of the invention, FIG. 4 and FIG. 5 show configurations in which the loop antenna 103 and the monopole antenna 113 are on opposite sides of the substrate 101. Thus, the loop antenna 103 is located on the first side 115 of substrate 101 and the monopole antenna 113 is located on the opposite or second side 117. Although the energy diversity antenna 100 will operate well using both the preferred or alternative embodiments of the invention, this alternative embodiment can be used in situations where the monopole antenna 113 is longer and would otherwise contact the surface of the loop antenna 103 if both were used on the same side of the substrate 101. In this context, a long monopole antenna 113 would have it's own independent surface and which could not contact the loop antenna 103.

Thus to summarize, the energy diversity antenna 100 consists of a combination of two highly effective antennas, a loop antenna 103 and a monopole antenna 113 on a single planar substrate 101. The advantage of the energy diversity antenna 100 is that a receiving device (not shown) can be used to switch between either the loop antenna 103 or the monopole antenna 113, which are both collocated. As with normal diversity systems switching would occur in response to the best received signal i.e. one having the highest amplitude. This signal can be either in an E field or an H field region of a multipath environment. This represents an antenna system that can be used to receive E-field and H-field energy with a diversity receiver which reflects the title of the present application.

The energy diversity antenna 100 is particularly applicable for use with a communication device or radio transceivers the incorporate diversity features. The diversity transceiver/receiver can help with multi-path interference by switching to either antenna which gives the best reception. It should be realized by those skilled in the art, that either the loop antenna 103 or the monopole antenna 113 can be used for transmitting, although transmit antenna would be fixed until the circuitry, within the communication device, can adequately select which of the two antenna is optimal for transmitting by constantly monitoring impedances or other antenna parameters.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A energy diversity antenna comprising:

a substrate having a first side and a second side;

a monopole antenna positioned on the first side of the substrate;

a loop antenna positioned on the second side of the such that the loop extends around the monopole antenna; and wherein the monopole antenna and loop antenna are positioned on opposite sides of the substrate to extend the physical length of the monopole antenna without interfering with the loop antenna and further wherein the monopole antenna and the loop antenna are fed with separate feed lines so as a receiving device may switch between the monopole antenna and loop antenna depending on received signal strength.

2. A diversity antenna as in claim 1 wherein the monopole antenna is comprised of a plurality of interconnected linear segments.

3. A diversity antenna as in claim 2 wherein the plurality of interconnected linear segments form a serpentine shape.

4. A diversity antenna as in claim 1 wherein the loop antenna is capacitively coupled to its respective feed line.

5. An diversity antenna structure comprising:

at least one substrate having a first side and a second side;

a monopole antenna positioned on the first side of the at least one substrate;

a loop antenna extending around the monopole antenna and positioned on the second side of the at least one substrate; and wherein the monopole antenna and the loop antenna are positioned on opposite sides of the at least one substrate to extend the physical length of the monopole antenna without interfering with the loop antenna and further wherein the monopole antenna and the loop antenna are fed with separate feed lines so as a receiver may switch between the monopole antenna and the loop antenna depending on a received signal strength.

6. A diversity antenna as in claim 5 wherein the loop includes a coupler for capacitively coupling a feed line to the loop.

7. A diversity antenna as in claim 6 wherein the coupler forms a plurality of substantially L-shaped segments.

8. A diversity antenna as in claim 5 wherein the loop extends around a perimeter of the at least one substrate.

9. An energy diversity antenna comprising:

a substrate;

a monopole antenna for receiving a radio frequency signal having E-field energy;

a loop antenna positioned about the loop antenna for receiving a radio frequency signal having H-field energy; and wherein the monopole antenna and loop antenna are positioned on opposite sides of the substrate to extend the physical length of the monopole antenna without interfering with the physical layout of the loop antenna.

10. An energy diversity antenna as in claim 9 wherein the substrate is printed circuit board.

11. An energy diversity antenna as in claim 9 wherein the first antenna and the second antenna are fed with separate feed lines.

12. An energy diversity antenna as in claim 9 wherein the first antenna is coupled to a feed line using a capacitive coupler.

13. An energy diversity antenna as in claim 9 wherein the first antenna and the second antenna are substantially planar structures.

* * * * *